United States Patent
Horvath

[15] 3,676,417

[45] July 11, 1972

[54] POLYMERIZATION USING A SUPPORTED CHROMIA ACTIVATED WITH A TIN ON GALLIUM COMPOUND

[72] Inventor: Bertalan Horvath, Berlin, Germany
[73] Assignee: Phillips Petroleum Company
[22] Filed: Feb. 25, 1971
[21] Appl. No.: 118,947

Related U.S. Application Data

[62] Division of Ser. No. 727,706, May 8, 1968, Pat. No. 3,622,522.

[52] U.S. Cl. .................260/94.9 D, 252/430, 260/88.2 B, 260/93.7
[51] Int. Cl. ..........................C08f 1/66, C08f 3/06
[58] Field of Search ...........260/94.9 D, 94.9 E; 252/430

[56] References Cited
FOREIGN PATENTS OR APPLICATIONS 691,381  7/1964  Canada..............................260/94.9 D
95,884  11/1960  Netherlands.....................260/94.9 D

*Primary Examiner*—Joseph L. Schofer
*Assistant Examiner*—A. Holler
*Attorney*—Young and Quigg

[57] ABSTRACT

A catalyst is formed by combining a support material with (1) a chromium-containing compound such as chromium trioxide and (2) at least one of a gallium-containing compound such as gallium isopropoxide, and a tin-containing compound such as tin isopropoxide, and then activating the catalyst by heating at a temperature of at least 1,700° F. Polymers such as polyethylene formed using the catalyst of this invention have a narrow molecular weight distribution.

5 Claims, No Drawings

POLYMERIZATION USING A SUPPORTED CHROMIA ACTIVATED WITH A TIN ON GALLIUM COMPOUND

This application is a division of my copending application, Ser. No. 727,706, filed May 8, 1968 now U.S. Pat. No. 3,622,522.

This invention relates to a new and improved catalyst composition and the method for making same. This invention also relates to a polymerization process employing the catalyst of this invention.

Heretofore 1-olefin polymers have been formed using chromium oxide-containing catalysts. Such polymers have been formed using a process known as a "solution process" wherein the polymer is formed dissolved in the solvent used for the polymerization process. Such a polymerization operation is disclosed in U.S. Pat. No. 2,825,721, the disclosure of which is hereby incorporated herein by reference. Polymers of 1-olefins have also been formed by another process known as the "particle-form process" wherein the polymer is obtained in a solid, particulate form in a slurry with the diluent used for the polymerization process. Such a process is disclosed in U.S. Pat. Nos. 2,825,721, 3,087,917, and British Pat. No. 853,414, the disclosures of which are hereby incorporated herein by reference.

By this invention the catalyst can be used in both the solution and the particle form process. By using a catalyst prepared according to this invention, the melt index of the polymer obtained from either the solution or the particle form process, when compared to conventional catalysts, is increased. An increase in melt index of the polymer obtained from the particle form process by the catalyst prepared according to this invention is a very advantageous result. For example, the relatively high melt index of the 1-olefin polymers obtained by use of the catalyst prepared according to this invention allows such polymers to be used in paper coating applications and as substitutes for microcrystalline waxes. These are applications heretofore not always possible for particle form process polymers because of the low melt index of such polymers when made with certain conventional catalysts. By the use of the catalyst of this invention polymers having the full desired melt index range, including the very high melt index range portion, can be produced in the particle form process. This being so, a manufacturer using the catalyst prepared according to this invention does not have to build a separate solution process plant in order to make higher melt index polymers.

Further, as indicated in The Modern Plastics Encyclopedia, 1965, page 244, a number of properties of polymers of 1-olefins such as polyethylene, are improved by narrowing the molecular weight distribution in the polymer. Properties that are improved are impact strength, brittleness temperature, and melt extensibility. An indication of the molecular weight distribution in a given polymer is the ratio of high-load melt index (hereinafter referred to as HLMI) to regular melt index (hereinafter referred to as MI). The ratio of HLMI/MI is sometimes referred to as shear response and is determined in accordance with ASTM D–1238–62T, condition F for HLMI and condition E for MI. It is known that the lower the value for this ratio, the narrower the molecular weight distribution in the polymer.

It was surprisingly discovered that low shear response is achieved in polymers made using the catalyst prepared according to this invention.

Thus, the catalyst prepared in accordance with this invention has very distinct advantages in that it can be used in both the solution and particle form processes to produce polymers having the full desired melt index range, while at the same time the polymers so produced have a narrower molecular weight distribution thereby improving certain physical properties of that polymer.

According to this invention catalysts capable of effecting the results set forth hereinabove are obtained by combining a support material with at least one gallium or tin compound as defined hereinafter, and a chromium-containing compound also defined hereinafter wherein at least part of the chromium is in the hexavalent state or is convertible at least in part to hexavalent chromium by heating in the presence of an oxygen-containing material, e.g., composition or compound, such as air, and/or oxygen (e.g., molecular oxygen), and then activating this combination of materials by heating at a temperature of at least 1,700° F (but below the temperature at which the catalyst or materials forming said catalyst substantially decompose) in an oxygen-containing gas that is substantially water-free, and for a time sufficient to activate the composition to have catalytic effect for the polymerization of known monomers.

The process for making the catalyst of this invention comprises providing a support material and dispersing on that support material at least one gallium- and/or tin-containing compound and at least one chromium-containing compound in amounts effective for forming a catalytically active composition, after which the catalyst is activated as set forth hereinabove.

The polymerization process of this invention comprises polymerizing mono-1-olefins in a conventional manner except that the catalyst employed for the process is a catalyst prepared according to this invention.

The polymers produced using the catalyst prepared according to this invention are useful for paper coating or for making plastic articles such as bottles, e.g., baby bottles; bottle carriers, and the like in a conventional manner such as by blow molding.

Accordingly, it is an object of this invention to provide a new and improved method for preparing a polymerization catalyst.

It is another object of this invention to provide an improved polymerization catalyst.

It is another object of this invention to provide a new and improved polymerization process.

It is another object of this invention to provide an improved catalyst, process for making same, and a polymerization process, all of which contribute to producing 1-olefin polymers having high melt indexes, particularly when the polymerization process employed is a particle-form process.

Another object of this invention is to provide an improved catalyst, process for making that catalyst, and a polymerization process using that catalyst which all contribute to increasing the melt index of the polymers produced thereby, and also to producing a polymer which has a narrow molecular weight distribution as evidenced by low values of shear response.

Other aspects, objects, and the several advantages of this invention will be apparent to those skilled in the art from the description and appended claims.

By this invention, conventional catalyst supports or bases, e.g., silica, alumina, zirconia, thoria, and mixtures of two or more of these materials, are combined with at least one gallium compound represented by the formula $Ga(OR)_m$ and/or at least one tin compound represented by the formula $Sn(OR')_n$, wherein $m$ and $n$ are equal to the valence of the gallium or tin, e.g., 3 for gallium and 4 or 2 for tin, and wherein R and R' are each selected from the group consisting of alkyl, aryl, and cycloalkyl groups, and combinations thereof such as aralkyl, alkaryl and the like, each group having one to 12, preferably one to six, carbon atoms, inclusive.

If the gallium or tin compound used is liquid, it can be combined with the support as such or dissolved or dispersed in an organic solvent or dispersant. If the gallium or tin compound used is solid, it can be dissolved or dispersed in an organic solvent or dispersant for subsequent combination with the support. The gallium or tin compound can be combined with the support in a conventional manner known in the art such as impregnation, spraying, refluxing and the like.

Examples of suitable gallium compounds that can be used are gallium methoxide, gallium isopropoxide, gallium n-butoxide, gallium isononoxide, gallium dodecoxide, gallium cyclopentoxide, gallium cyclooctoxide, gallium cyclododecoxide, gallium phenoxide, gallium toloxide, gallium benzyloxide, and the like.

In making the catalyst of this invention, sufficient amount of gallium compound or compounds is employed so that the final catalyst contains from about 0.1 to about 15, preferably from about 0.5 to about 10, weight per cent gallium based on the total weight of the final catalyst.

Suitable examples of tin compounds that can be used are both the stannous and stannic forms of the gallium compounds set forth hereinabove except that tin is substituted for the gallium in the recitation of those compounds.

In making the catalyst of this invention with tin compounds, a sufficient amount of tin compound or compounds is employed so that the final catalyst contains from about 0.1 to about 15, preferably from about 0.5 to about 10, weight per cent tin based on the total weight of the final catalyst.

In making the catalyst of this invention with both gallium and tin compounds, sufficient amounts of each of the compounds used is employed so that the final catalyst contains from about 0.1 to about 15, preferably from about 0.5 to about 10, weight per cent gallium plus tin based on the total weight of the final catalyst.

The chromium-containing compound or compounds can be added to the base before, after, or together with the gallium and/or tin compounds. Combinations thereof such as before and during the addition of the gallium and/or tin compounds to the base can also be used. The chromium-containing compound or compounds is added to the base in any conventional manner including those set forth hereinabove with respect to the addition of the gallium or tin compounds to the base. In one mode of application the chromium-containing compound can be dispersed on the support by fluidizing the gallium- or tin-containing support with the chromium-containing compound. For example, chromium trioxide is fluidized with a gallium- or tin-containing support at a temperature sufficiently elevated to melt the chromium trioxide, e.g., from about 385° to about 500° F. The chromium-containing compound can also be dispersed with the support by use of an organic solution or dispersion of substantially any chromium-containing compound. Suitable chromium-containing compounds include chromium trioxide, $Cr(OR'')_y$, or $CrO_2(OR'')_2$ wherein $R''$ is defined in the same manner as set forth hereinabove with respect to the gallium- and tin-containing compounds and $y$ is 2, 3, 4, or 6.

Examples of suitable chromium-containing compounds include chromium (valence II) isopropoxide, chromyl tert-butoxide, chromyl isobutoxide, chromium (valence III) dodecoxide, chromyl methylcyclopentoxide, chromium (valence IV) phenoxide, chromyl benzyloxide, chromium (valence VI) ethoxide, and the like.

In making the catalysts of this invention, a sufficient amount of chromium-containing compound or compounds is employed so that the final catalyst contains from about 0.1 to about 50, preferably from about 0.1 to about 10, weight per cent based on the weight of the final catalyst of chromium oxide calculated as chromium trioxide. In addition it is preferred that at least 0.1 weight per cent of the total weight of the final catalyst be chromium in the hexavalent state.

The gallium or tin compounds used in this invention can be obtained commercially or prepared in a conventional manner known in the art. The gallium or tin compounds can be freshly prepared from the metal or from salts of the metal. For example, tin or gallium alkoxide can be prepared by refluxing the metal or salt thereof with a small amount of mercuric chloride catalyst, and/or iodine, in an alcohol such as ethyl alcohol. Following the formation of the alkoxide, the support material, e.g., silica, is added, the excess alcohol containing dissolved iodine and mercuric chloride is evaporated or filtered off, and the chromium compound is added from a nonaqueous solution of chromium salt or chromium trioxide or by use of a chromium compound neat. A gallium or tin compound of this invention that has not been freshly prepared can be added to the support from a nonaqueous solution such as an alcohol, toluene, and the like, by refluxing the materials together for from 1 to 10 hours.

Following the application of the gallium-, tin- and chromium-containing compounds, the resulting supported composition is separated from any excess solution and/or dispersion, and, if desired, dried in a conventional manner such as by heating at a temperature in the range of from about 75° to about 500° F for a period of from about 1 minute to about 5 hours in a substantially anhydrous atmosphere.

In this invention phrases to the effect of "substantial absence of water" and the term "nonaqueous" and the like mean that less than 0.1 weight per cent water is present based on the total weight of the materials present.

Thereafter, the catalytic composition is activated by heating at a temperature in the range of at least 1,700° F but below the temperature at which the catalyst and any of its constituents substantially decompose, preferably from about 1,700° to about 200° F, more preferably from about 1,700° to about 1,800° F. The activation is carried out in air which is substantially water free and for a period sufficient to activate the catalyst, generally for from about 1 to about 50 hours. Activation can be accomplished by heating the catalyst composition in a stream of gas, preferably a gas which contains oxygen and is substantially water free. Preferably the dew point of the activation gas is below 75° F, still more preferably below 0° F. Inert gases such as carbon dioxide and nitrogen can also be used if desired.

Optionally a reduction step can be practiced following the activation step for from about 1 to about 10 hours using carbon monoxide, for example, at a temperature in the range of from about 400° to about 1,600° F.

The results of the activation step are such that at least part of the chromium in the catalyst is in and/or converted to the hexavalent state.

The chromium- and/or gallium- and/or tin-containing materials can be applied to the support under any operable conditions of temperature, pressure, and the like including room temperature and atmospheric pressures as well as elevated temperatures and pressures. The concentrations of the chromium- and/or gallium- and/or tin-containing compounds when used in solution or dispersion is that which is sufficient to give the desired amount of chromium oxide and gallium and/or tin in the final catalyst as set forth hereinabove.

Generally, when employing nonaqueous solvents or dispersants for depositing the gallium- and/or tin-containing and chromium-containing compounds on the support, substantially any nondeleterious and nonaqueous solvent or dispersant can be used. For the gallium- and/or tin-containing compounds, such materials include hydrocarbon solvents selected from the group consisting of saturated aliphatic, saturated cycloaliphatic, and aromatic hydrocarbons having four to 12 carbon atoms per molecule inclusive, e.g., n-heptane, toluene, cyclohexane, dodecane, methylcyclopentane, benzene, and the like. Other suitable solvents or dispersants for the gallium and/or tin compound are alcohols having from one to 10 carbon atoms per molecule, inclusive, and nitrogen-containing compounds set forth hereinafter with respect to the chromium-containing compounds.

Although substantially any nondeleterious, nonaqueous solvent or dispersant can be used for the chromium-containing compound, it is presently preferred that a polar solvent or dispersant be used. Preferred polar solvents or dispersants are nitrogen-containing compounds such as pyridine, N-methylpyrrolidone, N,N-dimethylformamide, acetonitrile, N,N-diethylacetamide, N,N-dimethylacetamide, triethylamine, methyl-substituted pyridines, formamide, n-butylamine, dipropylamine, aniline, methylaniline, toluidine, phenylenediamine, diphenylamine, triphenylamine, benzidine, and the like. Other solvents or dispersants that can be used for the chromium-containing compound include alcohols as defined hereinabove for the gallium- and/or tin-containing compound, e.g., propyl alcohol, isobutyl alcohol, sec-butyl alcohol, tert-butyl alcohol, amyl alcohol, cyclohexanol, cresols, phenol, and the like. When alcohols are used as solvents or dispersants for the chromium-containing compound, —OR groups can be substituted for one or more of the oxygen atoms in the chromium-containing compound so that the impregnating solution or dispersion contains a mixture of species. As indicated before the terms "nonaqueous solvent or dispersant" or "substantially nonaqueous solvent or dispersant" are meant to include a solvent or dispersant or mixture of solvents or dispersants that contains less than 0.1 weight per cent water based on the total weight of the solvent or dispersant or mixture of solvents or dispersants. Also, a nonaqueous or substantially nonaqueous solution or dispersion will contain less than 0.1 weight per cent water based on the total weight of the solution or dispersion.

The catalyst of this invention can be employed in any conventional solution or particle-form process for homopolymerizing or copolymerizing mono-1-olefins (1-olefins) having two to eight carbon atoms per molecule, inclusive. Examples of suitable 1-olefins include ethylene, propylene, 4-methyl-1-pentene, 1-hexene, 1-octene, and the like.

Polymerization processes using the catalyst of this invention can employ broad ranges of operating conditions. Generally, the polymerization temperature will range from about 100° to about 500° F using pressures ranging from about 100 to about 700 psi or higher and catalyst concentrations of from about 0.001 to about 10 weight percent based upon the weight of the reactor contents. Reaction is carried out gas phase, liquid phase, or in the presence of a diluent or solvent. The diluents or solvents used can also vary widely but will generally be paraffins and/or cycloparaffins having from 3 to 12 carbon atoms per molecule, inclusive. Examples of such diluents include propane, isobutane, normal butane, normal pentane, isopentane, isooctane (2,2,4-trimethylpentane), cyclohexane, methylcyclohexane, normal hexane, neohexane, diisopropyl, normal heptane, 2-methylhexane, triptane, normal octane, normal nonane, isononane, cyclopentane, methylcyclopentane, the dimethylcyclopentanes, dimethylcyclohexane, and the like. Full and complete disclosures of such polymerization processes can be found in U.S. Pat. Nos. 2,825,721 and 3,098,917, and British Pat. No. 853,414.

EXAMPLE I

Catalysts were prepared using silica-supported chromium trioxide as a catalyst by itself, i.e., no added metal alkoxide, and with aluminum isopropoxide added thereto or gallium ethoxide added thereto, or tin isopropoxide added thereto.

These catalysts were tested in a particle form polymerization process wherein ethylene was polymerized using a 3-liter stirred reactor. In the polymerization process the reactor was warmed to about 220° F and flushed with dry nitrogen. The catalyst, suspended in 1,100 milliliters of isopentane, was then charged. The reactor was maintained at a temperature of about 220° F and ethylene was then added as used and in amounts sufficient to maintain pressure of 450 psig over a reaction period of from 50 to 90 minutes.

In preparing the catalysts used in this example, microspheroidal silica containing 0.1 weight per cent aluminum based on the total weight of the silica was dried at 500° F for 2 to 3 hours. Thereafter, the alkoxide was added to the support in the manner set forth hereinbelow for each separate catalyst formed. Thereafter, sufficient chromium trioxide solution in dimethylformamide was added to the silica to add 1.9 weight per cent chromium trioxide to the final catalyst, the weight per cent being based upon the total weight of the final catalyst. Each catalyst was then activated for 5 hours in dry air (air containing less than five parts per million water) at the temperatures indicated hereinbelow.

The method of adding the alkoxide compound for each catalyst was as follows:

Runs 1 through 5

No materials were added to the silica-supported chromium trioxide, but different activation temperatures were employed as set forth hereinbelow.

Runs 6 through 9

The support was refluxed for 4 hours in toluene with sufficient aluminum isopropoxide to deposit 5.8 weight percent aluminum on the support based upon the total weight of the final catalyst.

Run 10

Gallium chloride (5.0 g) plus about 0.05 gram of iodine was refluxed in ethyl alcohol for about 3.5 hours. The support was then added and refluxing was continued for 4 hours, after which the product was filtered and dried by heating at 350° F for about 10 minutes in an air atmosphere. The gallium content of the final catalyst was about 4.2 weight percent based upon the total weight of the final catalyst.

Run 11

The support was refluxed for one hour in isopropyl alcohol with about 0.05 gram iodine and sufficient gallium ethoxide to give 10.8 weight percent gallium in the final catalyst based on the total weight of the final catalyst.

Run 12

This catalyst was prepared in the same manner as that used in Run 10. The gallium content of the final catalyst was 4.0 weight percent based upon the total weight of the final catalyst.

Run 13

This catalyst was prepared in the same manner as that used in Run 10. The gallium content of the final catalyst was 4.2 weight per cent based upon the total weight of the final catalyst.

Run 14 n-Butyl tin trichloride (about 8 grams) was refluxed for 4 hours with about 0.05 gram of iodine in 150 ml isopropyl alcohol. Thereafter, the support was added and refluxing was continued for 8 hours, after which the product was filtered and dried. The tin content of the final catalyst was 3.7 weight per cent based upon the total weight of the final catalyst.

Run 15

This catalyst was prepared in the same manner as that used in Run 14. The tin content of the final catalyst was 4.8 weight per cent based upon the total weight of the final catalyst.

The results of the various runs are set forth hereinbelow:

TABLE I

| Alkoxide metal | Run No. | Activation temp., °F. | MI | HLMI | HLMI/MI |
|---|---|---|---|---|---|
| None | 1 | 1,300 | 0.09 | 7.1 | 79 |
|  | 2 | 1,500 | 0.15 | 12 | 80 |
|  | 3 | 1,600 | 0.15 | 13.7 | 91 |
|  | 4 | 1,700 | 0.25 | 21.2 | 85 |
|  | 5 | 1,800 | 0.06 | 8 | 134 |
| Aluminum | 6 | 1,300 | 0.041 | 4.68 | 114 |
|  | 7 | 1,700 | 0.18 | 14.5 | 80 |
|  | 8 | 1,800 | 0.053 | 7.4 | 140 |
|  | 9 | 1,900 | (¹) | (¹) | (¹) |
| Gallium | 10 | 1,300 | 0.04 | 5.4 | 135 |
|  | 11 | 1,700 | 0.5 | 31.2 | 62.4 |
|  | 12 | 1,800 | 0.51 | 33.6 | 66 |
|  | 13 | 1,900 | 0.39 | 29.4 | 75.4 |
| Tin | 14 | 1,700 | 0.26 | 19.4 | 74.5 |
|  | 15 | 1,800 | 0.25 | 19.5 | 78 |

¹ Catalyst dead.

From the above it can be seen that at the same activation temperature the aluminum alkoxide additive gave a broader molecular weight distribution as evidenced by the HLMI/MI ratio than the runs where either gallium alkoxide or tin alkoxide was added. It can further be seen from Table I that at activation temperatures of 1,700° F or higher, and at the same activation temperature, where either gallium alkoxide or tin alkoxide was added (Runs 11–15), the molecular weight distribution was narrower as evidenced by the lower HLMI/MI ratios than Runs 1–5 where no metal alkoxide was present and Runs 7–9 where an aluminum alkoxide was present.

Thus, in contrast with the results obtained by using an aluminum alkoxide additive, it was surprisingly found that with the gallium and tin alkoxide additives, the HLMI/MI ratio was decreased when activation temperatures of at least 1,700° F were employed.

Thus, an unexpected lowering of HLMI/MI ratios is obtained when gallium and tin alkoxides are used together with an activation temperature of at least 1,700° F, and that such a result is unobvious from the use of aluminum alkoxide compounds since, at the same activation temperature, these compounds tend to have substantially the same or an increased HLMI/MI ratio over the catalyst where no alkoxide compound is present.

The use of ethoxides of gallium and tin instead of isopropoxides of gallium and tin will have negligible effect on the catalytic activity of the gallium- and tin-containing catalysts as opposed to the aluminum-containing catalyst wherein aluminum isopropoxide was employed because the ethoxide and isopropoxide moieties are decomposed during the activation step to produce the metal oxide, carbon, and hydrogen so that after activation no difference could be determined between catalysts where ethoxide and iso-propoxide moieties were present.

EXAMPLE II

Solution polymerization runs were made using the 1.4 liter stirred reactor. The reactor was warmed to about 225° F and flushed with dry nitrogen after which the catalyst was charged suspended in 435 milliliters of cyclohexane. The reactor was then heated to 280° F and ethylene charged as used and in amounts sufficient to maintain a pressure of 450 psig during a one hour reaction period.

A portion of the silica of Example I was prepared and activated in the same manner as set forth in Example I. After alkoxide addition, chromium was added in the same manner as in Example I. The method of adding the different alkoxides to the catalysts of this Example were as follows:

Run 16

Gallium metal (1 gram) was refluxed for 16 hours with 0.4 gram of mercuric chloride and 0.4 gram of iodine in 120 ml isopropyl alcohol. The support was then added and refluxing was continued for 8 hours. Thereafter, the impregnated support was filtered out and dried at 350° F for about 10 minutes under air atmosphere. The gallium content of the final catalyst was 8 weight per cent based upon the total weight of the final catalyst.

Runs 17, 18, and 19

Gallium chloride (5 grams) was refluxed for 3.5 hours with 0.05 gram of iodine in 150 ml of ethyl alcohol. The support was then added and refluxing was then continued for 4 hours. Thereafter, the impregnated support was filtered out and dried at 350° F for about 10 minutes under an air atmosphere. The gallium content of the final catalyst was 4.1 weight percent based upon the total weight of the final catalyst.

Run 20 n-Butyl tin trichloride (5 grams) was refluxed with 4 grams of support and 0.05 gram of iodine for 6 hours in isopropyl alcohol. Thereafter, the product was filtered out and dried at 350° F for about 10 minutes under an air atmosphere. The tin content of the final catalyst was 2.8 weight percent based upon the total weight of the final catalyst.

Run 21

Tin tetrachloride (1 gram) was refluxed with 4 grams of support and 0.05 gram of iodine for 2 hours in 65 ml of isopropyl alcohol. Thereafter, the impregnated support was filtered out and dried at 350° F for about 10 minutes under an air atmosphere. The tin content of the final catalyst was 9.0 weight percent based upon the total weight of the final catalyst.

The results of the different runs are set forth hereinbelow:

TABLE II

| Alkoxide metal | Run No. | Activation temp., ° F. | MI | HLMI | HLMI/MI |
|---|---|---|---|---|---|
| Gallium | 16 | 1,600 | 22.3 | 518 | 23.2 |
|  | 17 | 1,700 | 29.5 | 670 | 22.7 |
|  | 18 | 1,700 | 30.9 | 700 | 22.6 |
|  | 19 | 1,800 | 27.0 | 584 | 21.6 |
| Tin | 20 | 1,550 | 25.4 | 568 | 22.4 |
|  | 21 | 1,700 | 36.8 | 844 | 22.9 |

The above data show that the catalyst prepared according to this invention can be used in a solution polymerization process and that the polymer so produced will have a high melt index together with a narrow molecular weight distribution as indicated by the low HLMI/MI ratios.

Reasonable variations and modification are possible within the scope of this disclosure without departing from the spirit and scope thereof.

I claim:

1. A process for polymerizing at least one mono-1-olefin which comprises contacting said mono-1-olefin under polymerization conditions with a catalyst comprising: a support material of at least one of silica, alumina, zirconia, thoria, and mixtures thereof; at least one chromium-containing compound wherein at least part of the chromium is at least one of in the hexavalent state and convertible to the hexavalent state by heating in the presence of oxygen and/or an oxygen-containing material, and at least one of at least one gallium-containing compound having the formula $Ga(OR)_m$ and at least one tin-containing compound having the formula $Sn(OR')_n$, wherein $m$ and $n$ are equal to the valence of the gallium or tin, and wherein R and R' are each selected from the group consisting of alkyl, aryl, cycloalkyl groups, and combinations thereof, each group having 1–12 carbon atoms, inclusive, and heating the resulting combination of materials at a temperature of at least 1,700° F but below the temperature at which the combined materials decompose for a time sufficient to activate the combined materials to be catalytically active for the polymerization of monomers.

2. A process according to claim 1 wherein said mono-1-olefin is selected from those having from two to eight carbon atoms per molecule and said chromium-containing compound is chromium oxide.

3. A process according to claim 1 wherein the polymerization conditions comprise: a temperature range from about 100° to about 500° F, a pressure range from about 100 to about 700 psi, and a catalyst concentration of from about 0.001 to about 10 weight percent based upon the weight of reactor contents.

4. A process according to claim 1 wherein the polymerization catalyst comprises chromium trioxide, the compound having the formula $Ga(OR)_m$ is gallium isopropoxide, the compound having the formula $Sn(OR')_n$ is stannic isopropoxide, and the support material is silica-alumina.

5. A process according to claim 4 wherein mono-1-olefin is ethylene.

* * * * *